United States Patent Office 3,202,594
Patented Aug. 24, 1965

3,202,594
PROCESS FOR ACTIVATING PLATINUM ELECTRODES
Raymond Steele, Westtown, Pa., assignor to J. Bishop & Co. Platinum Works, Malvern, Pa., a corporation of Pennsylvania
No Drawing. Filed May 28, 1962, Ser. No. 197,938
10 Claims. (Cl. 204—140)

The present application is a continuation-in-part application of my parent application Serial No. 127,480, filed July 28, 1961, and entitled "Process for Treating Platinum Coated Electrodes."

This invention relates to a process for activating platinum to improve its usefulness as an electrode and has for an object the improved process of treating platinum-coated electrodes to lower their overvoltage characteristics in the electrolysis of solutions.

The present invention is particularly applicable to the treatment of platinum coated electrodes for the electrolysis of brine to manufacture chlorine and caustic soda. The most commonly used anode material in the electrolysis of brine is graphite. Graphite is sufficiently resistant to chlorine and low enough in cost to justify its use as an anode material for chlorine production when compared with other materials or combinations of materials which have been available in the past. Nevertheless, the use of graphite anodes has entailed a number of costly disadvantages due principally to its gradual disintegration in the corrosive and erosive cell environment. The need for an improved anode material has been recognized for many years and various types of metallic anodes have been proposed in the past. Among these are solid or massive platinum, platinum covered with an electrodeposited layer of platinum black (called "platinized platinum"), platinum-plated tantalum and platinum-plated titanium. The platinized platinum and massive platinum electrodes are generally prohibitive for commercial use by reason of their high cost. Moreover, a platinum black surface is impractical in any case because of the extreme fragility of this form of platinum. Thus the platinum-plated or coated electrodes have been receiving more consideration for use in chlorine cells although their initial cost is substantially more than that of graphite anodes. Tests on platinum-plated anodes have indicated that the rate of loss of platinum in brine electrolysis is in the order of 0.5 gram of platinum or less per ton of chlorine produced. The cost of this is less than that of the seven to fifteen pounds of graphite per ton of chlorine which is commonly lost in the chlorine process. In addition to this saving in anode material cost, adoption of these metallic anodes is expected to lead to lower power costs, lower labor costs due to less frequent anode and diaphragm replacement, and other savings and advantages such as the production of purer chlorine and a higher current efficiency.

In the electrolysis of solutions for the production of chlorine and the like, one of the major costs is that of electric power. From the standpoint of power savings, it will be apparent that metallic anodes will reduce power consumption at a number of points in the cell circuit. For example, the voltage drop at the connection between the anode and power leads will be lowered due to better electrical contact between them. The voltage drop through the anode itself will not increase during use as in the case of graphite which decreases in cross section area as it disintegrates. In diaphragm cells a voltage drop occurs through the asbestos diaphragm and this increases as the diaphragm becomes progressively clogged during use. Such clogging is in large part due to particles of graphite and to impregnating oils carried over from the eroding anodes and hence its occurrence and effect will be considerably less in cells equipped with metallic anodes. The voltage drop through the electrolyte between the anode and cathode remains substantially constant when metallic anodes are employed. This is in contrast to the situation with graphite anodes which for example may decrease from 1¼" to less than ¼" in thickness during use. This decrease is accompanied by an increase in the anode-cathode gap in diaphragm cells and a corresponding increase in voltage drop through the brine.

In the operation of commercial diaphragm type chlorine cells, the voltage is usually increased as required to maintain a constant current and steady chlorine production. In a typical example of a diaphragm cell operating at 0.8 ampere per square inch anode current density, the voltage, after installation of a new set of graphite anodes, is 3.5 volts and this rises to 4.2 volts in about seven months when the anodes have become so worn that they must be replaced. Thus, the average cell voltage is about 3.8 volts or 0.3 volt above its initial level. This increase in voltage represents a direct increase in the cost of producing chlorine. For example, in areas where power costs are in the order of $0.006 per kilowatt hour, the increase of 0.3 volt imposes an additional cost of about $1.30 per ton of chlorine. In the operation of mercury cathode type chlorine cells, anode to cathode distance is periodically readjusted as the graphite wears away by use of a special mechanism. This mechanism is expensive and the labor for adjustment is costly. These additional costs may be substantially reduced or eliminated by replacing graphite anodes with platinum-plated metallic anodes.

One of the most important factors related to power consumption and not taken into consideration in the above paragraph is the voltage drop at the anode surface due to the chlorine overvoltage of the anode material. Overvoltage may be defined as that voltage in excess of the reversible or equilibrium E.M.F. which must be applied to cause an electrode reaction to take place at a desired rate. Chlorine overvoltage varies with the anode material and its physical condition. It increases with anode current density but decreases with increase in temperature.

In operating various platinum coated anodes in brine electrolysis, it will be noted that the current will fall off from its initial level unless upward adjustments in the cell voltage are made. This is largely due to an increase in the chlorine overvoltage at the anode. The magnitude of this additional voltage or overvoltage is, as previously noted, a function of the electrode composition and its physical condition. The time required for the overvoltage to reach a constant level is less at high current densities, but in any case may vary from a matter of a few minutes to a number of hours. It is important, in the interest of economic use of platinum anodes, that this tendency to develop overvoltage be reduced.

It is well-known that anodes coated with platinum black have the lowest overvoltage in the liberation of chlorine electrolytically. However, as pointed out above, the fragile nature of platinum black makes it practically prohibitive for commercial use. The present invention is concerned with the treatment of sound platinum deposits so as to lower the overvoltage thereof to closely approximate that of the platinum black surface.

In my aforesaid co-pending application, there was disclosed a method of treating an electrode having a coating including at least one noble metal of the platinum group to provide an improved surface for catalyzing electrode reactions by first charging the coating with hydrogen and then heating the electrode to a predetermined temperature and for a time sufficient to produce at least some recrystallization of the platinum. The platinum group includes the noble metals in Group VIII of the periodic chart, namely ruthenium, rhodium, palladium, osmium, iridium and platinum and the coating on the electrode may comprise an alloy to two or more such metals. As pointed out in my copending application, the coating may be charged with hydrogen by electrolyzing it cathodically in alkaline solution and the heating may be done in air at a temperature within the range from 700° F. to 1,000° F. for a period, for example, from a few minutes to a number of hours, sufficient to bring about some recrystallization of the platinum.

The economic importance of reducing the tendency of platinum to acquire a chlorine overvoltage in the electrolysis of brine was pointed out in my aforesaid co-pending application and it was shown that the process disclosed in that application accomplished such reduction to a substantial degree. However, it was noted that while the performance of anodes treated according to the process in my aforesaid co-pending application closely approached the performance of the ideal platinized platinum at low current densities, the overvoltage difference between these anodes and the platinized platinum anodes became greater at higher current densities.

I have now found that by alloying platinum or at least one noble metal of the platinum group with mercury and decomposing this with heat, the platinum is left in a highly activated condition. Such highly activated condition enables platinum-coated anodes to operate in brine electrolysis at lower voltages than platinum coatings which did not have this treatment.

In accordance with one aspect of the present invention, there is provided a method of activating an electrode having a coating including at least one noble metal of the platinum group. Such method includes the steps of contacting the platinum group coating with an amalgam of an alkali metal so as to produce a coating of mercury over the surface of the platinum group coating, removing any alkali metal from the coating of mercury on the platinum group coating, and heating the electrode to a temperature sufficient to bring about further reaction between the platinum and mercury and to distill off the mercury leaving the platinum group coating on the electrode in an activated condition.

In the first example illustrating the present invention, a comparison is made between three electroplated platinum-titanium anodes which were identical originally but which subsequently received different treatments before being installed in a chlorine cell. Each of the anodes identified as specimens A, B and C were cut from a single sheet of commercial grade titanium 1/16" thick. The specimens were each in the form of strips 9" long and 1" wide. Each strip was masked with electroplaters tape and plated for 4" of its length on both sides with a platinum deposit. The approximate eight square inches of platinum surface extended from a line one-half inch from the bottom of each strip to a line four and one-half inches from the bottom. The three strips were first racked together and, prior to plating, they were etched in a concentrated hydrochloric acid solution containing 1% hydrofluoric acid for about one minute and then in concentrated hydrochloric acid at 35° C. for six hours. They were then plated together in a sulphato-dinitrito-platinous acid solution whose current efficiency was about 21%. Bath temperature was 50° C., current density was 0.05 ampere per square inch, and plating was carried out for 50 minutes. After the foregoing plating operation, specimen A received no further treatment and was installed in a small diaphragm type chlorine cell and tested in the "as plated" condition. It was run for a period of 18 hours at 20 amperes and then cell voltages were measured at various current densities as shown in the following table.

To provide a comparison between an untreated electrode and one treated in accordance with the process disclosed in my aforesaid co-pending application, specimen B was then treated according to the process of my co-pending application. This was done by electrolyzing specimen B in an alkaline sodium phosphate solution and then heating for ten minutes at 800° F. Specimen B was then run as an anode in the chlorine cell for 18 hours at 20 amperes prior to measuring cell voltages at the same current densities used in testing specimen A.

From the following table, it will be seen that throughout the current density range of from about 1 to 3 amperes per square inch the cell voltage for a cell, including the specimen B anode, was approximately .30 to .35 volt less than for the untreated platinum plated anode identified as specimen A.

Specimen C was treated in exactly the same manner as specimen B and was then electrocleaned cathodically in an alkaline cleaner and immersed in a sodium amalgam for about two minutes. When specimen C was withdrawn, the platinum was covered with a bright film of mercury. The specimen C electrode was then soaked in water to remove sodium present in the mercury as sodium hydroxide. After the electrode was dried, it was then heated for about 15 minutes at about 800° F. during which time the mercury reacted further with the platinum and then distilled off. The color of the platinum changed from a light gray to black by this treatment. The anode C was then tested in a chlorine cell in the same manner as anodes A and B. Such test procedures are disclosed in my aforesaid co-pending application.

From the following table, it will be seen that the cell voltages derived from the use of anode C treated in accordance with the process of the present invention in all instances were lower than the cell voltages obtained either with anodes A or B and through the entire range of current densities. It will be further noted that as the current density increased, the voltage difference likewise increased in regard to anode C.

*Table I*

| Current, Amps | Current Density, Amps/Sq. In. | Voltage Difference (A-B), v. | Voltage difference (B-C), v. |
|---|---|---|---|
| 8 | 1.00 | 0.34 | 0.01 |
| 10 | 1.25 | 0.35 | 0.04 |
| 12 | 1.50 | 0.37 | 0.05 |
| 14 | 1.75 | 0.36 | 0.07 |
| 16 | 2.00 | 0.35 | 0.10 |
| 18 | 2.25 | 0.35 | 0.15 |
| 20 | 2.50 | 0.37 | 0.20 |
| 22 | 2.75 | 0.30 | 0.30 |
| 24 | 3.00 | 0.30 | 0.33 |

As a second example, another test was run in a similar manner but using two strips D and E of titanium each plated with platinum for 2 inches of its length. The platinum plating was carried out under the same conditions as in Example 1 but for only 32 minutes. By utilizing a smaller platinum surface area, the tests in the chlorine cell could be performed at higher current densities on the order of those used, or which might be used in the future, in commercial mercury cells. The specimen D was treated in the same manner as anode B above and the specimen E received the same treatment as anode C including the amalgamation process. The voltage advantage of anode E over D at current densities ranging from 1 to 5½ amperes per square inch is shown in Table II below.

*Table II*

| Current Amps | Current Density, Amps/Sq. In. | Voltage Difference, (D-E), v. |
|---|---|---|
| 4 | 1.0 | 0.22 |
| 8 | 2.0 | 0.31 |
| 12 | 3.0 | 0.36 |
| 16 | 4.0 | 0.45 |
| 20 | 5.0 | 0.55 |
| 22 | 5.5 | 0.61 |

As seen from Table II, the anode E, like anode C (both treated in accordance with the process of the present invention) showed a further voltage advantage the magnitude of which increased as the applied current density increased. Thus, it will be seen that anodes prepared according to the present invention will be particularly useful in applications where high current densities are involved such for example as in mercury cells which are designed for generation of chlorine at high current densities. A smaller advantage is derived where lower current densities are involved such for example when used in diaphragm cells which operate at lower current densities.

In the above examples, the platinum deposits which were amalgamated were first subjected to the process described in my aforesaid co-pending application.

While the platinum deposit produced by the process disclosed in my aforesaid co-pending application is well-suited for further activation by my present process, it is to be understood that my present process is not limited in its application to that particular deposit. The present process can be applied to any sound platinum deposit, i.e., a platinum deposit having the ability to withstand the amalgamation and amalgam decomposition without degradation.

The sodium amalgam referred to above may be formed by electrolyzing a solution of a sodium salt such as sodium chloride with mercury as a cathode. Due to the high overvoltage of hydrogen on mercury, sodium is preferentially discharged and forms an alloy with the mercury. Such alloy usually contains about 0.2% sodium. The process of the present invention is not limited to the use of sodium amalgam but may make use of other amalgams such as potassium amalgam, lithium amalgam or other means of combining the platinum and mercury such as, for example, exposing the platinum to mercury vapor, electroplating mercury on platinum, etc.

The heating of the mercury coated platinum may take place at various temperatures for example within the range between room temperature up to about 900° F. depending upon the time involved. However, the final heating should be performed at a temperature high enough to expel all the mercury, preferably in the 500° F. to 900° F. range.

While the present invention is particularly applicable to improving electrodes for chlorine production, such amalgamation process is also applicable to electrodes for other electrolytic processes which can be benefitted by a more active surface for catalyzing electrode reactions such for example as fuel cell electrodes. It is not limited in its application to platinum deposits but is also applicable to massive platinum, platinum in various fabricated forms and platinum powders. While the invention has been described primarily in connection with the treatment of platinum for the purpose of activation, it is also applicable to other metals of the platinum group previously mentioned as well as alloys of these metals with each other (e.g. platinum-rhodium) and alloys of the platinum group metals with another metal (e.g. palladium-silver).

What is claimed is:

1. The method of activating an electrode having a coating including at least one noble metal of the platinum group comprising contacting the platinum group coating with an amalgam of an alkali metal so as to produce a coating of mercury over the surface of the platinum group coating, removing any alkali metal from the coating of mercury on the platinum group coating, and heating the electrode to a temperature sufficient to bring about further reaction between the platinum and mercury and to distill off the mercury leaving the platinum group coating on the electrode in an activated condition.

2. The method of activating an electrode according to claim 1 wherein said amalgam of alkali metal comprises sodium amalgam.

3. The method of activating an electrode according to claim 1 wherein said amalgam of alkali metal comprises a potassium amalgam.

4. The method of activating an electrode according to claim 1 wherein said amalgam of an alkali metal comprises a lithium amalgam.

5. The method of activating a platinum-coated electrode comprising heating the electrode to a predetermined temperature and for a time sufficient to produce at least some recrystallization of the platinum, contacting the platinum surface of the electrode with an amalgam of an alkali metal so as to produce a coating of mercury over the platinum surface, removing any alkali metal with water from the coating of mercury on the platinum, and heating the electrode to a temperature sufficient to distill off the mercury leaving the platinum coating on the electrode in an activated condition.

6. The method of activating a platinum-coated electrode comprising heating the electrode to a predetermined temperature and for a time sufficient to produce at least some recrystallization of the platinum, immersing the platinum surface of the electrode in a sodium amalgam so as to produce a coating of mercury over the platinum surface, soaking the electrode in water to remove any sodium present as sodium hydroxide, and heating the electrode to a temperature sufficient to distill off the mercury leaving the platinum coating on the electrode in an activated condition.

7. The method according to claim 6 wherein the electrode is heated to a temperature in the order of 500° F. to 900° F. to distill off the mercury.

8. The method of activating a platinum-coated electrode so as to lower the overvoltage thereof for a chlorine cell comprising charging the platinum surface with hydrogen by electrolyzing it cathodically in an alkaline solution, heating the electrode to a temperature within a range from 700° F. to 1,000° F. for a time which produces at least some recrystallization of the platinum, contacting the platinum surface of the electrode with an amalgam of alkali metal so as to produce a coating of mercury over the platinum surface, removing any alkali metal with water from the coating of mercury on the platinum, and heating the electrode to a temperature sufficient to distill off the mercury leaving the platinum coating on the electrode in an activated condition.

9. An electrode treated in accordance with the method of claim 1.

10. The method of providing an effective platinum-coated titanium anode for the electrolysis of brine in the production of chlorine comprising the steps of electrolyzing the platinum coating cathodically in an alkaline solution, heat treating the anode at a temperature within a range from 700° F. to 1000° F. to bring about some recrystallization of the platinum, contacting the platinum coating with an alkali metal amalgam to deposit a coating of mercury on the platinum coating, and heating the anode from room temperature up to a temperature in the order of 500° F. to 900° F. to first bring about further alloying of the mercury and platinum and then to expel the mercury thereby leaving the platinum coating on the anode in an activated condition.

References Cited by the Examiner

UNITED STATES PATENTS

| 1,427,171 | 8/22 | Smith | 204—292 |
| 1,940,934 | 12/33 | Bennett | 252—472 |
| 2,760,912 | 8/56 | Schwarzenbek | 252—472 |
| 3,055,811 | 9/62 | Ruff | 204—292 |

JOHN H. MACK, *Primary Examiner.*